Aug. 22, 1939.  O. A. RIEMAN  2,170,217
ELECTRICAL CONNECTING DEVICE
Filed Dec. 23, 1936
FIG.I.
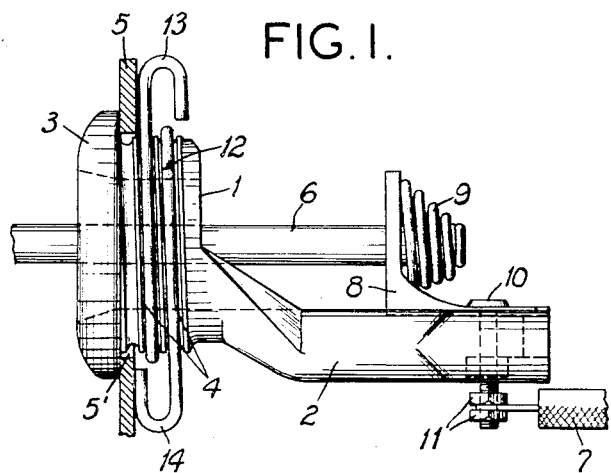
FIG.2.
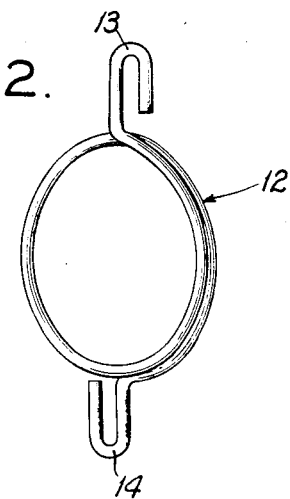
INVENTOR:
O. A. Rieman Patented Aug. 22, 1939

2,170,217

UNITED STATES PATENT OFFICE 2,170,217

ELECTRICAL CONNECTING DEVICE

Otto A. Rieman, St. Louis, Mo.

Application December 23, 1936, Serial No. 117,393

1 Claim. (Cl. 173—339)

This application is a continuation-in-part of my application Serial Number 46,894 filed October 26, 1935, for Electrical connecting device, which issued as Patent No. 2,072,042 on Feb. 23, 1937, and relates to improvements in electrical connecting devices and more particularly to the type which is commonly known as "electrode receptacles" and employed on gaseous signs for receiving the luminous tube electrode and connecting it to an electrical conductor.

The object of this invention is to provide improved means for connecting or clamping an electrode receptacle to the supporting plate of a gaseous sign.

Other objects of my invention will become apparent from the following description taken in connection with the accompanying drawing in which Figure 1 is a side view of an electrode receptacle showing my improved means positioned thereon for securing it to the support; and Figure 2 is a perspective view of the securing means.

Referring in detail to the drawing, the electrode receptacle shown is made of insulating material and comprises a cylindrical portion 1 to which is integrally attached an arm 2 extending from the cylindrical portion in an axial direction. The cylindrical portion is provided with a flange 3 at its outer end and the external surface is formed with a plurality of threads 4 for receiving my novel attaching means for clamping the receptacle to the supporting plate 5 of a sign construction after the receptacle has been inserted in the support opening 5' and the flange positioned against the surface of the plate. The outer end of arm 2 is shown as having mounted thereon suitable connecting means for electrically connecting a gaseous tube electrode 6 to an electrical conductor 7. The connecting means shown comprises a supporting member 8 of suitable conducting material, such as brass or copper, to which a spiral spring 9 is attached for receiving the end of the tube electrode and this supporting member is bolted to the end of the arm by a bolt 10 of such length that the electrical conductor 7 may be secured thereto by nuts 11.

My novel means for clamping the receptacle to the supporting plate and forming the subject matter of this application is a coiled member 12, the convolutions of which are adapted to cooperate with threads 4 on the cylindrical portion. The coiled member is preferably made of a relatively stiff wire and turned once and a half upon itself, thus placing the ends 13 and 14 thereof diametrically opposite each other in the manner shown although more turns may be employed if desired. Each of the ends are preferably bent toward the body of the coiled member in the shape of a U and these U ends extend outwardly from the body in a lateral direction. The forming of the ends of the coiled member in the manner shown insures that the member will contact the rear surface of the supporting plate at two points on opposite sides of the cylindrical portion of the receptacle when the receptacle is in position and the member is screwed on the cylindrical portion. Thus the flange 3 will be firmly clamped against the outer surface of the supporting plate notwithstanding opening 5' may be somewhat larger than the cylindrical portion. The ends may be bent in other shapes if desired as long as both ends are capable of contacting the rear surface of the supporting plate, however the arrangement shown has been found to be the most satisfactory as it permits the coiled member to be reversed. If ends 13 and 14 were both on one side of the coiled member as has been common practice or if these ends were not so bent as both would contact the supporting plate, there would be only two adjacent points or only one point of contact between the clamping member and the back of the supporting plate when the coiled member was in position, thus resulting in the receptacle being unsteadily held on the supporting plate in opening 5'. With my improved clamp this insecure and shaky connection between the receptacle and the supporting plate is eliminated. The ends 13 and 14 also provide convenient projections which may be engaged by the fingers and thumb of the hand to readily perform the screwing operation.

Although I have shown my novel clamping member employed with only one type of receptacle, it is understood that it may be readily applied to other types. Also being aware of the possibility of modifications in the particular structure herein described without departing from the fundamental principles of my invention, I do not intend that its scope be limited except as set forth by the appended claim.

Having fully described my invention, what I claim as new and desire to secure by Letters Patent of the United States is:

In a clamping member for detachably clamping an electrode receptacle to a support which receptacle has a cylindrical portion for extending through an opening in a supporting plate and is provided with a flange for engaging one surface of the plate adjacent the opening and with threads on its external surface, said clamping member comprising a coiled member made of wire and adapted to be screwed on the threads, the ends of the wire extending outwardly on diametrically opposite sides of the coiled member to provide abutment surfaces and also means to facilitate screwing the coiled member on the threads, each of said ends having a radially extending portion forming an abutment surface at one end of the coiled member and a bent portion forming an axially spaced abutment surface positioned at the other end of the coiled member, the abutment surface of the bent portion of each end lying in the same plane as the abutment surface of the radially extending portion of the other end whereby each end will directly engage diametrically opposite portions of the surface of the supporting plate when the coiled member is screwed on the threads of the receptacle either end first.

OTTO A. RIEMAN.